US009137945B2

(12) United States Patent
Farley et al.

(10) Patent No.: US 9,137,945 B2
(45) Date of Patent: Sep. 22, 2015

(54) METHOD OF CONTROLLING A CONVEYANCE RATE OF GRAIN OF AN UNLOADER SYSTEM

(71) Applicant: CNH AMERICA LLC, New Holland, PA (US)

(72) Inventors: Herbert M. Farley, Elizabethtown, PA (US); Karl R. Linde, Leola, PA (US); Cooper W. Linde, Lyndell, PA (US); Kevin W. Ward, Lititz, PA (US); James A. Hitch, Sinking Spring, PA (US); Wayne T. Flickinger, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 151 days.

(21) Appl. No.: 13/718,118

(22) Filed: Dec. 18, 2012

(65) Prior Publication Data

US 2014/0169932 A1 Jun. 19, 2014

(51) Int. Cl.

| | |
|---|---|
| ***B60P 1/42*** | (2006.01) |
| ***A01D 41/127*** | (2006.01) |
| ***A01D 41/12*** | (2006.01) |

(52) U.S. Cl.

CPC .......... *A01D 41/1272* (2013.01); *A01D 41/127* (2013.01); *A01D 41/1217* (2013.01); *B60P 1/42* (2013.01)

(58) Field of Classification Search

CPC ....... B65G 15/00; B65G 67/08; A01D 41/127

USPC .................................................. 414/813, 526

See application file for complete search history.

(56) References Cited

U.S. PATENT DOCUMENTS

| | | | | |
|---|---|---|---|---|
| 3,233,755 | A | 2/1966 | Glenn | |
| 3,559,893 | A | 2/1971 | Gruben | |
| 4,522,553 | A | 6/1985 | Nelson et al. | |
| 5,584,640 | A | 12/1996 | Johnson | |
| 6,430,904 | B1 * | 8/2002 | Coers et al. | 56/10.3 |
| 7,452,180 | B2 | 11/2008 | Talbi et al. | |
| 2008/0095599 | A1 | 4/2008 | Hahn | |
| 2009/0290970 | A1 | 11/2009 | Farley et al. | |
| 2009/0305840 | A1 | 12/2009 | Oliver | |
| 2010/0287899 | A1 * | 11/2010 | Mackin et al. | 56/10.2 R |

FOREIGN PATENT DOCUMENTS

| | | | |
|---|---|---|---|
| RU | 2411406 | C2 | 2/2011 |
| WO | 9906237 | A1 | 2/1999 |

OTHER PUBLICATIONS

M. Ferguson, Massey Ferguson 6400/7400 Series Brochure, Forager Mode, Sep. 7, 2011, pp. 21, 23, USA.

* cited by examiner

*Primary Examiner* — Saul Rodriguez
*Assistant Examiner* — Ashley Romano
(74) *Attorney, Agent, or Firm* — Patrick M. Sheldrake; Seyed V. Sharifi T.

(57) ABSTRACT

A method of controlling a conveyance rate of grain of an unloader system, including providing a grain holding device and an unloader in communication with the grain holding device, the unloader having an inlet for receiving grain from the grain holding device and an outlet for discharging grain. An apparatus within the grain holding device is operable for controllably feeding grain within the grain holding device to the unloader. The method includes monitoring a parameter associated with a power source of the apparatus, and comparing the parameter of the power source to a maximum predetermined threshold value. The method includes automatically controlling the conveyance rate of grain of the apparatus to the unloader.

19 Claims, 5 Drawing Sheets

METHOD OF CONTROLLING A CONVEYANCE RATE OF GRAIN OF AN UNLOADER SYSTEM

FIELD OF THE INVENTION

The present invention relates generally to control of an apparatus within a grain holding device for feeding grain to an unloader operable for conveying the grain from the holding device. More particularly, the present invention relates generally to controlling a conveyance rate of an unloader system based upon monitoring an operating parameter of an apparatus feeding grain to the unloader system and comparing the parameter to a maximum predetermined threshold value.

BACKGROUND OF THE INVENTION

Current grain holding systems, such as combine grain tank unloading systems of agricultural harvesters, typically consist of single or multiple apparatus, typically, a cross conveyor or conveyors, that feed grain to an unloader conveyor or conveyors, typically a vertical unloader conveyor including an unloader conveyor element, such as an auger, operable for lifting the grain to a generally horizontal conveyor or auger that conveys the grain to a truck or other holding bin. Currently, most cross, vertical and horizontal conveyors or augers can only operate the system at a maximum unload or discharge rate or a shut-off condition.

Agricultural harvesters harvest many different types of grain with varying moisture contents. The unload rate of the grain from the agricultural harvester can vary greatly, depending on the type of grain and the moisture content of the grain. The amount of engine power that is consumed by the unloading system also varies greatly with the type and moisture content of the grain. Generally, corn having a moisture content greater than 25 percent will consume the highest amounts of engine power.

It is highly desirable to maximize the harvesting rate of an agricultural harvester, which typically requires operating the agricultural harvester at its maximum engine power. Unfortunately, due to the increased amount of engine power that is consumed by the unloading system when unloading crops that consume high amounts of power are encountered, such as corn having higher moisture contents, agricultural harvesters may be subjected to operating conditions exceeding maximum engine power, resulting in stalling of the agricultural harvester. In contrast, when unloading crops that consume reduced amounts of power, agricultural harvesters may have additional engine power that is available for use.

Accordingly, there is a need for a method of controlling the conveyance rate of an unloader system of an agricultural harvester based on monitoring a parameter of the harvester's power source, in order to maximize operating performance. For example, the conveyance rate of the unloader system would be decreased in response to the parameter exceeding a predetermined maximum value, and increased in response to the parameter being less than a predetermined maximum value.

SUMMARY OF THE INVENTION

In accordance with one aspect of the present invention, a method of controlling a conveyance rate of grain of an unloader system includes providing a grain holding device and providing an unloader in communication with the grain holding device, the unloader having an inlet for receiving grain from the grain holding device and an outlet for discharging grain. The method further includes providing an apparatus within the grain holding device operable for controllably feeding grain within the grain holding device to the unloader. The method further includes monitoring a parameter associated with a power source of the apparatus. The method further includes comparing the parameter of the power source to a maximum predetermined threshold value and automatically controlling the conveyance rate of grain of the apparatus to the unloader.

In accordance with another aspect of the present invention, a method of controlling a conveyance rate of grain of an unloader system includes providing a grain holding device. The method further includes providing an unloader in communication with the grain holding device, the unloader having an inlet for receiving grain from the grain holding device and an outlet for discharging grain. The method further includes providing an apparatus within the grain holding device operable for controllably feeding grain within the grain holding device to the unloader. The method further includes selectively setting an operating parameter of the apparatus to a predetermined value, and monitoring the parameter of a power source of the apparatus. The method further includes comparing the parameter of the power source to a maximum predetermined threshold value and automatically controlling the conveyance rate of grain of the apparatus to the unloader.

In accordance with still another aspect of the present invention, a method of controlling a conveyance rate of grain of an unloader system of an agricultural harvester includes providing a grain holding device on the harvester. The method further includes providing an unloader in communication with the grain holding device, the unloader having an inlet for receiving grain from the grain holding device and an outlet for discharging grain from the harvester. The method further includes providing an apparatus within the grain holding device operable for controllably feeding grain within the grain holding device to the unloader. The method further includes monitoring a parameter associated with a power source of the apparatus and comparing the parameter of the power source to a maximum predetermined threshold value. The method further includes automatically controlling the conveyance rate of grain of the apparatus to the unloader.

An advantage of the control method of the present invention is that by monitoring and comparing an operating parameter of the unloader system to a maximum predetermined threshold value, a conveyance rate of grain can be controlled to maximize performance.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
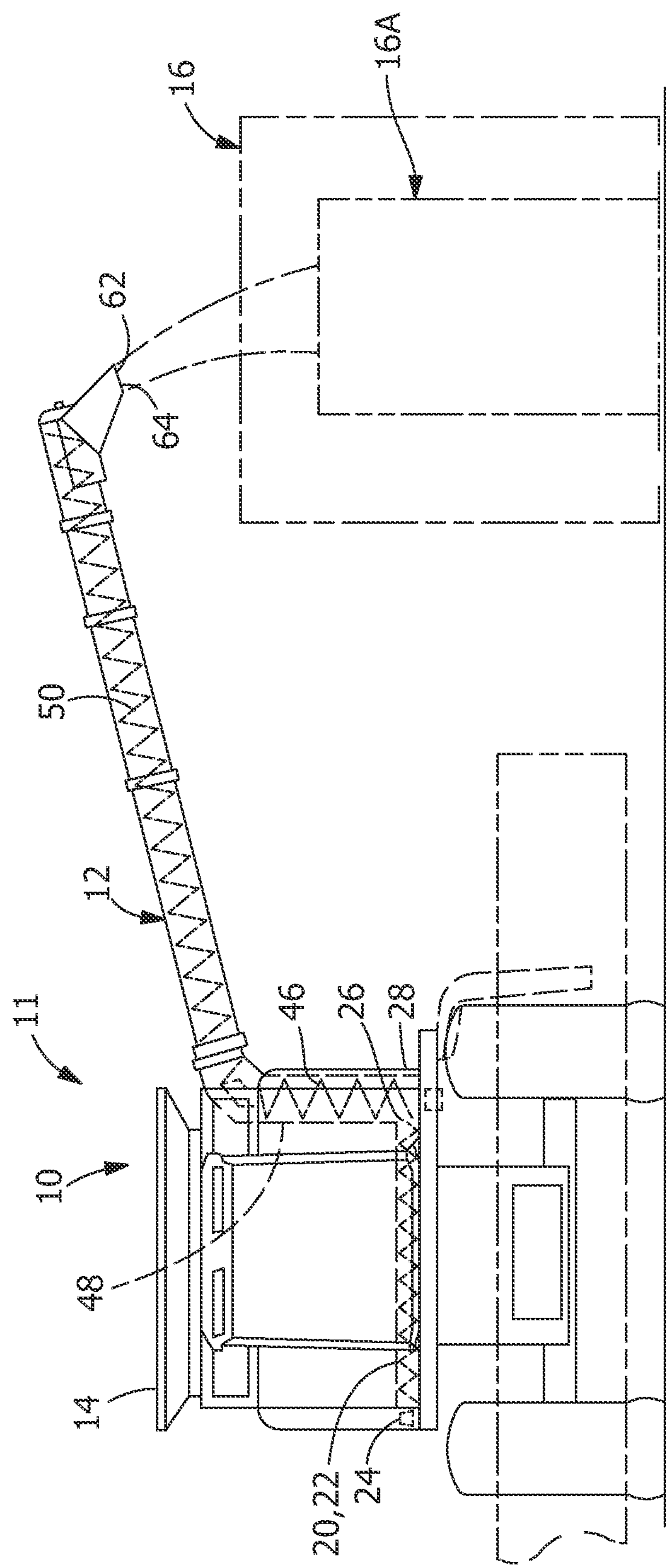
FIG. 1 is a simplified front view of a representative agricultural harvester, including an unloader controllably operable according to the present invention for unloading grain from a grain tank of the machine into an accompanying receptacle.

Referring now to the drawings, in FIG. 1, an exemplary agricultural harvesting machine or agricultural harvester 10 is shown, including an unloader system 11 having an unloader or unloader conveyor 12 in communication with or operable for unloading grain from a grain holding device, which is a conventional grain tank 14, located on an upper region of harvester 10. As shown in FIG. 1, harvester 10 is depicted as a well known, commercially available combine operable for harvesting a wide variety of grains, including, but not limited to, wheat, beans, corn, rice, and the like. Typically, the grain is harvested and threshed from stalks, pods, or other crop material, and conveyed away from a cleaning system of harvester 10 by a clean grain conveyor to a grain elevator (not shown). The grain elevator then lifts the grain upwardly to a grain delivery conveyor which is operable for discharging the grain into grain tank 14. When grain tank 14 is filled with grain, or filled to a desired level, unloader conveyor 12 can be operated for unloading the grain from tank 14, onto the ground, or into a wagon, truck or other vehicle, or a bin or other grain receptacle 16 (larger receptacle illustrated for example) or 16A (smaller receptacle).

In one embodiment, the grain tank and unloader or unloader conveyor can be associated with a stationary grain tank or movable grain tank that is not associated with a harvester.

Figure 2:
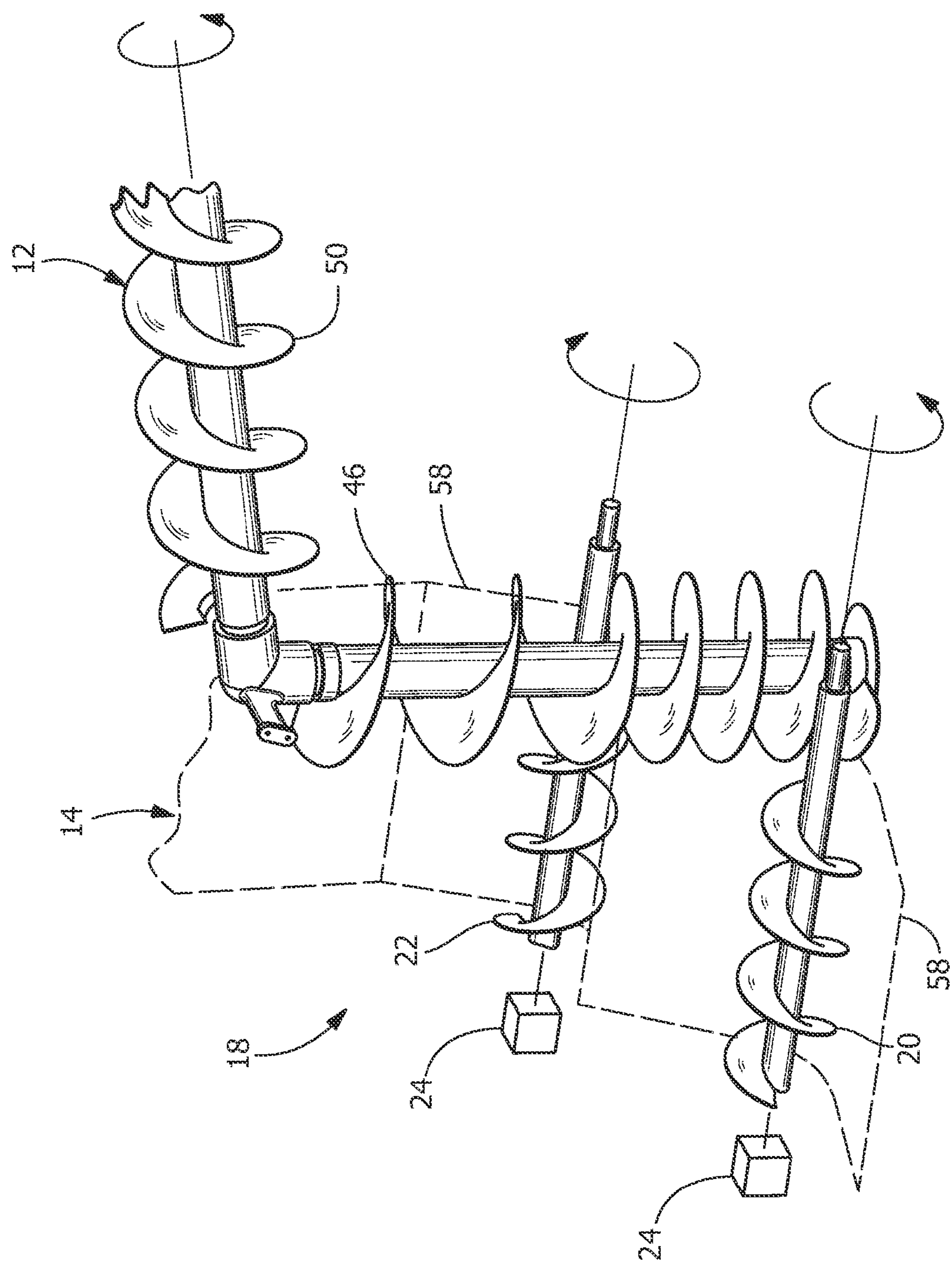
FIG. 2 is a simplified perspective view of aspects of the unloader of FIG. 1, in association with apparatus controllable according to the present invention for feeding grain to the unloader.
Figure 3:
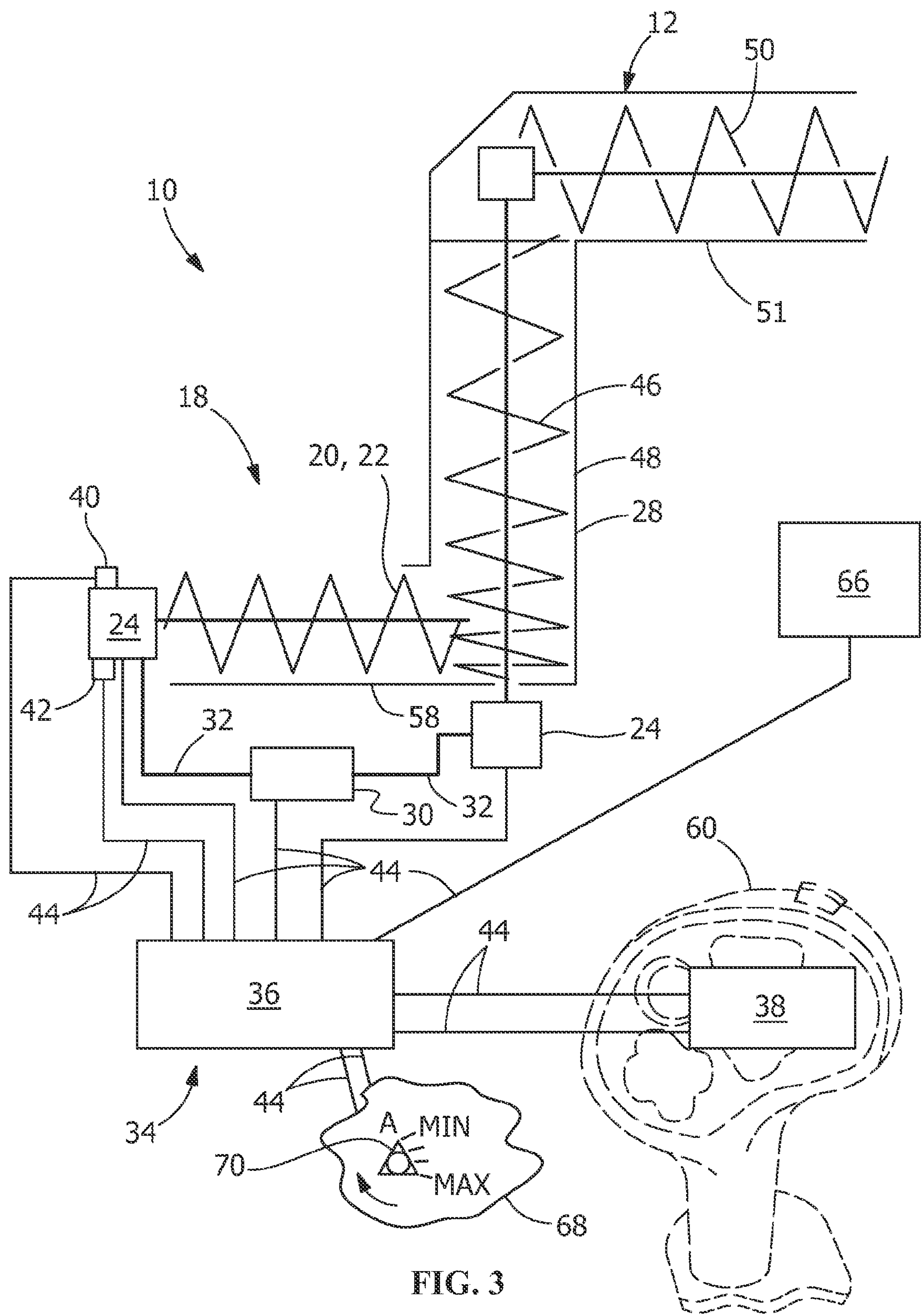
FIG. 3 is a simplified schematic representation of the unloader and associated apparatus of FIGS. 1 and 2, and additionally showing aspects of a control of the present invention.

Referring also to FIGS. 2 and 3, grain tank 14 includes apparatus 18 operable for feeding or conveying the grain contained therein to unloader conveyor 12. Here, apparatus 18 includes a pair of conventional cross conveyors 20 and 22 disposed in sideward extending covered troughs 58 in a floor of the grain tank, in the well known manner. Cross conveyors 20 and 22 each comprises a generally horizontal elongate helical auger rotatable by a drive 24 as denoted by the arrows in FIG. 2, for conveying grain through the respective troughs 58 to an opening 26 in an inlet end 28 of unloader conveyor 12. Grain conveyed to unloader conveyor 12 is discharged from an opening 64 at an outlet end 62 (FIG. 1). Here also, it should be noted that although apparatus 18 in grain tank 14 is illustrated including two cross conveyors 20 and 22 for feeding grain to unloader conveyor 12, a variety of other conveyor configurations can be utilized for performing this function, including, but not limited to, a single conveyor, or more than two conveyors, such as two cross conveyors that feed to a main conveyor, which, in turn, feeds the unloader conveyor. Also, although helical augers are shown, apparatus 18 can comprise other types of conveyors, such as a moving belt or belts, or any other apparatus suitable for feeding grain to the unloader conveyor. Covered troughs may be used to limit the flow of grain from the grain tank into troughs 58, and the pressure that can be exerted against conveyors 20 and 22 by the grain thereabove within the tank.

Drives 24 of conveyors 20 and 22 can include fluid motors driven by pressurized fluid received from a pump 30 via fluid lines 32. Alternatively, drives 24 can be electric motor drives, or mechanical drives such as belt drives, chain drives, or the like. In one embodiment, conveyors 20 and 22 can be driven separately from unloader conveyor 12. Referring particularly to FIG. 3, unloader conveyor 12 is driven by a drive 24 which can also be a fluid motor driven by pump 30, an electric motor drive, or a mechanical drive such as a belt drive, chain drive, or the like.

Drives 24 and pump 30 comprise elements of a control 34 of the invention, operable for controlling unloader conveyor 12 and apparatus 18, as will be further discussed. As further shown in FIG. 3, other elements of control 34 include a processor based controller 36, an input device 38, and at least one sensor, preferably including a pressure sensor 40 and a speed sensor 42 in the instance of a fluid drive, or an electrical signal sensor such as a current sensor in the instance of an electrical drive, or a torque or strain gauge in the instance of a mechanical drive, to name a few alternatives, all connected to controller 36 via suitable conductive paths 44, which can be, for instance, wires of a wiring harness, or a wired or wireless communications network.

As shown collectively in FIGS. 1 and 2, unloader conveyor 12 includes an elongate upwardly or generally vertically extending auger 46 supported for rotation in an upwardly extending tubular housing 48, and an elongate auger 50 oriented horizontally or at a small acute angle to horizontal, supported for rotation in an elongate tubular housing 51 connected to and forming a continuation of housing 48. Housing 51 and an upper portion of housing 48 are supported in cantilever relation by a lower portion of housing 48 for rotation relative thereto, between a sidewardly extending unloading position as shown in FIG. 1, and a rearwardly extending stowed position at about a 90 degree angle to the unloading position, in the well known manner. Auger 50 is connected to auger 46 for rotation thereby in a suitable manner, such as by bevel gears, a Hooke's joint, or the like, also in the well known manner, and auger 46 is driven by the drive 24 connected thereto.

In addition to grain unloading conditions as the harvester is operating on the go in the field, contrasting grain loading conditions may also occur. For example, resumption of unloading after cessation of operation, i.e., startup conditions, or when grain tank 14 begins to empty are discussed in greater detail in Applicant's U.S. Nonprovisional application Ser. No. 12/470,153, filed May 21, 2009, which is incorporated herein in its entirety by reference. It is to be understood that exemplary methods of controlling the rate of feeding grain to unloader conveyor of the present invention are configured to operate under such contrasting grain loading conditions, and is not further discussed herein.

As shown in FIGS. 2 and 3, sensor 40 and speed sensor 42 are illustrated in connection with drive 24 of one or more of cross conveyors 20 and 22, but can also be connected to one or more of augers 46, 50, i.e., any driven components of apparatus 18, and are operable for generating signals representative of operating parameters such as fluid pressure and rotational speed, respectively, of one or more components of apparatus 18, and outputting those signals to controller 36. For purposes of this application, the term apparatus can refer collectively to the components that comprise the apparatus, or to one or more of the components that comprise the apparatus. These operating parameters can be associated with consumption of engine power by apparatus 18. In another embodiment, such operating parameters can be associated with conveyance rate of grain by apparatus 18. Generally, both higher fluid pressure and lower rotational speed will be representative of a higher torque load or resistance to rotation of apparatus 18, resulting from blockage or resistance to entry of grain into inlet end 28. A lower fluid pressure and higher rotational speed of apparatus 18 will be representative of a lower torque load and less resistance. In the instance of an electrical drive, the operating current would be different, and in the instance of a mechanical drive, the measured torque or strain would be different, although these parameters could similarly be associated with consumption of engine power by the cross conveyors. Additionally, when grain tank 14 begins to empty, resulting in less grain in troughs 58, an even lower torque will be required. As special cases, at initiation of operation of apparatus 18, high pressure and little or no rotation of the components will be representative of a packed inlet end, and low pressure and maximum rotational speed will be interpreted as an empty or near empty condition. Controller 36 uses this pressure and speed information according to the invention, in combination with a continuously monitored closed feedback loop such as from an engine 66, involving calculation of the available engine power of the agricultural harvester or other operating parameter, as will be discussed in greater detail below to control the unloading operation. Again, in the instance of another type of drive, e.g., electrical drive, mechanical drive, other sensed conditions, e.g., electrical current, strain measurement or torque measurement would be used.

Control 34 is also configured to variably control operation of apparatus 18 utilizing input device 38, or another input device. This construction or set up recognizes that there are instances when maximum unload rate is not desired, e.g., when topping off a grain receptacle, or unloading into a smaller receptacle e.g., receptacle 16A in FIG. 1, where unloading at a higher rate may cause spillage or the like. In this regard, the input device could be utilized to vary the unload rate until a desired rate is found. Here, controller 36 of control 34 and input device 38 can be configured, e.g., programmed, to control operation of apparatus 18 responsive to inputted commands via input device 38 by virtue of a closed feedback loop based on an operating parameter, such as available engine power or a conveyance rate of grain or other suitable operating parameter. To facilitate convenient and simple operation, input device 38 can be located on a multifunction or propulsion handle 60 (FIG. 3) or other location. Alternately, an input device 70 can be positioned on an operator console 68 (FIG. 3). In one embodiment, as further shown in FIG. 3, input device 70 can be a knob rotatable between an automated mode ("A") in which operating parameters of apparatus 18 are automatically controlled, subject to a maximum threshold value, such as available engine power, and an operator controllable mode. In the operator controllable mode, the operator can selectively indicate a desired operating parameter of apparatus 18, such as rotational speed or grain conveyance rate between a minimum ("MIN") value and a maximum ("MAX") value, with such selective control also subject to a maximum threshold value, such as available engine power, grain conveyance rate, or other suitable operating parameter. It is to be understood that other input device arrangements may be used.

Control 34 can also be configured, e.g., programmed, to allow telematic control of the unloading operation from another vehicle, such as a vehicle containing or towing a receptacle into which the grain is being unloaded, e.g., a truck or tractor, or other remote location, such as a control center.

Figure 4:
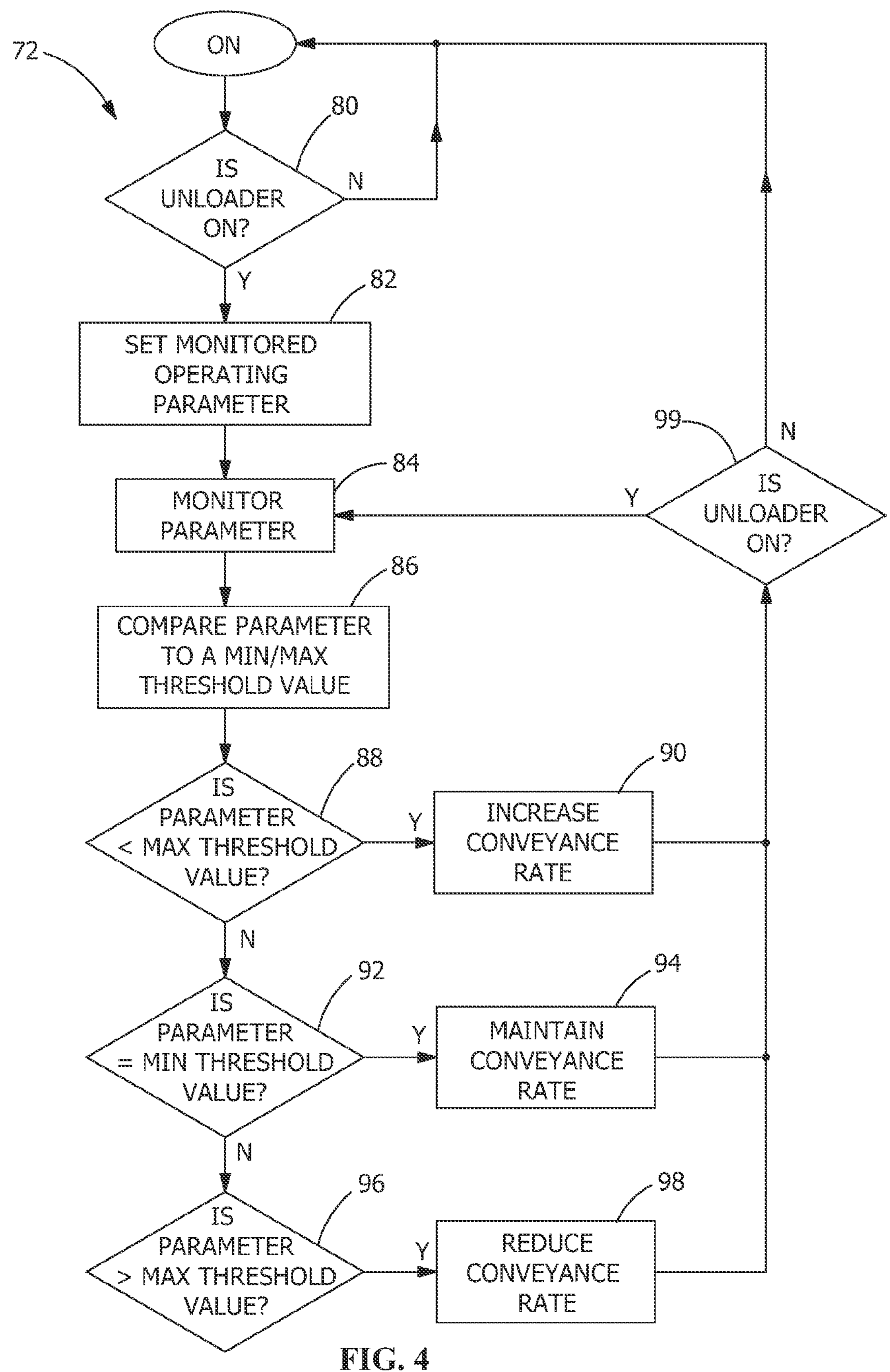
FIG. 4 is a flow diagram showing steps of an exemplary method of operation of the control of the present invention.

Referring to FIG. 4, an exemplary method 72 of controlling a rate of feeding grain to an unloader conveyor 12 of an agricultural harvester of the present invention is now discussed. As further shown in FIG. 4, method 72 is a continuous closed feedback loop in which controller 36 (FIG. 3) monitors whether the unloader system, and more specifically unloader conveyor 12 and apparatus 18, is on or operational, as denoted by decision block 80. If the unloader system is off or non-operational the control loop is restarted, but if the unloader system is on or operational, the control loop proceeds to optionally set an operating parameter to be monitored, such as a maximum or minimum conveyance rate, denoted by block 82. For example, operating parameters can include one or more parameters relating to the harvester, such as torque, speed, fuel consumption, coolant temperature, amperage, pressure and oil temperature may be monitored. For purposes of the disclosure, the term parameter can involve more than one parameter, such as pressure and rotational speed of one or more components and/or systems/subsystems. Once operating parameter is optionally set in block 82, that parameter, such as a parameter associated with a power source, such as the total engine power consumed, is monitored or measured, denoted by block 84. This measurement could be based upon a measurement of one or more of fuel consumption, engine speed or other suitable parameter. Once the parameter has been monitored or measured in block 84, the parameter is compared to a maximum predetermined threshold value in block 86. In one embodiment, in block 86 the parameter is also compared to a minimum predetermined threshold value, although both minimum and maximum predetermined threshold values are shown in block 86.

Once the parameter is compared to a maximum predetermined threshold value (and optionally also to a minimum predetermined threshold value) in block 86, in decision block 88, a determination is made whether the parameter is less than the maximum predetermined threshold value.

For purposes of discussion only and not intended to be limiting, if the parameter that is to be monitored in block 84 is total engine power consumed, the total engine power consumed is compared to at least a maximum predetermined threshold value, such as a maximum predetermined engine power value in block 86. The maximum predetermined engine power value can be 100 percent of the power that can be developed by the engine, or some lesser value, for reasons such as minimizing operating conditions that would exceed the maximum predetermined engine power value, resulting in stalling of the engine. Based upon the comparison in block 86, if the total power consumed is less than the maximum predetermined engine power value in block 88, there is available engine power. However, based upon the comparison in block 86, if the total power consumed is substantially equal to the maximum predetermined engine power value in block 92, there is essentially zero available power, as the engine power used is substantially equal to the engine power available. Finally, based upon the comparison in block 86, if the total power consumed is greater than the maximum predetermined engine power value in block 96, there is a shortfall of engine power, as the engine power used exceeds the available engine power.

If the total power consumed is less than the maximum predetermined engine power value in block 88, there is available engine power, and the conveyance rate of apparatus 18 is increased, denoted by block 90. The amount of increased conveyance rate can be a predetermined amount or percentage greater than the current conveyance rate, or in another embodiment, the predetermined amount of increased conveyance rate can correspond to a percentage of the available engine power. In one embodiment, the percentage can correspond to 100 percent of the available power.

Once the conveyance rate of apparatus 18 has been increased in block 90, control of the loop proceeds to block 99, in which controller 36 (FIG. 3) monitors whether the unloader system, and more specifically unloader conveyor 12 and apparatus 18, is on or operational. If the unloader system is off or non-operational the control loop is restarted, but if the unloader system is on or operational, the control loop returns to monitor an operating parameter as denoted by block 84, as previously discussed.

However, if the parameter, such as total power consumed is not less than the maximum predetermined engine power value in block 88, a determination is made whether total power consumed is substantially equal to the maximum predetermined threshold value, as denoted in block 92. If the amount of engine power consumed is substantially equal to be available power, there is no available engine power, and the conveyance rate of apparatus 18 is maintained, as denoted in block 94, and control of the loop proceeds to block 99.

In block 99, controller 36 (FIG. 3) monitors whether the unloader system, and more specifically unloader conveyor 12 and apparatus 18, is on or operational. If the unloader system is off or non-operational the control loop is restarted, but if the unloader system is on or operational, the control loop proceeds to monitor an operating parameter as denoted by block 84, as previously discussed.

However, if the amount of engine power consumed is not substantially equal to the maximum predetermined engine power value in block 92, a determination is made whether the amount of engine power consumed is greater than the maximum predetermined engine power value, as denoted in block 96. However, if the amount of engine power consumed is not less than the maximum predetermined engine power value (block 88) nor equal to the maximum predetermined engine power value (block 92), the amount of engine power consumed must be greater than the maximum predetermined engine power value (block 96). Since the amount of engine power consumed is less than the available power, there is a shortage of engine power, and the conveyance rate of apparatus 18 is reduced, as denoted in block 98, and control of the loop proceeds to block 99.

In block 99, controller 36 (FIG. 3) monitors whether the unloader system, and more specifically unloader conveyor 12 and apparatus 18, is on or operational. If the unloader system is off or non-operational the control loop is restarted, but if the unloader system is on or operational, the control loop proceeds to monitor an operating parameter as denoted by block 84, as previously discussed.

By virtue of the exemplary method of the present invention, harvester performance, such as engine power output, or other parameter as previously discussed, can be maintained relative to a maximum predetermined threshold value level by correspondingly increasing, maintaining or decreasing conveyance rate of the apparatus. Increasing, maintaining or decreasing conveyance rate of the apparatus occurs as a result of a feedback loop that continually monitors and then compares the parameter with a predetermined maximum threshold value.

Figure 5:
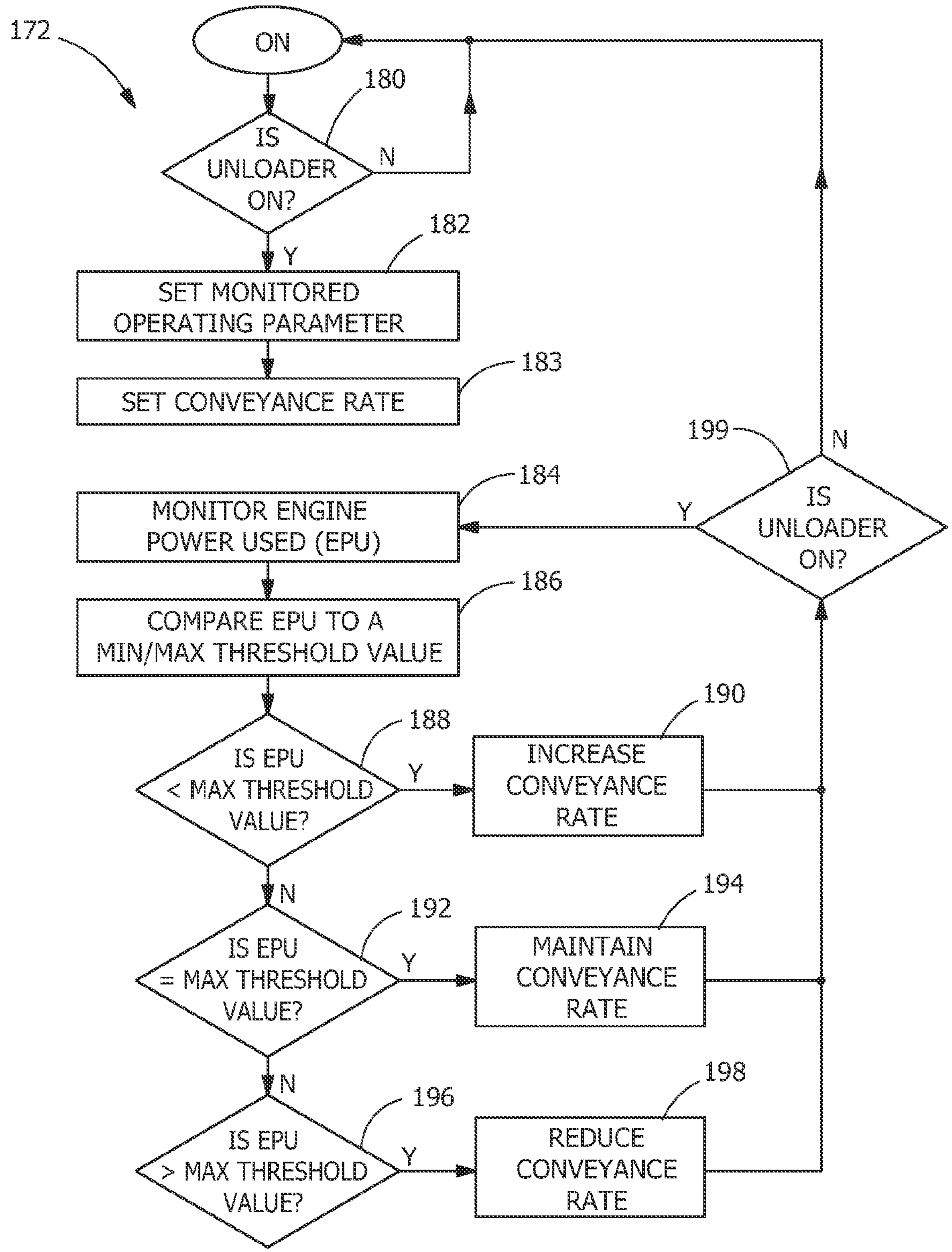
FIG. 5 is a flow diagram showing steps of an exemplary method of operation of the control of the present invention.

Referring to FIG. 5, an exemplary method 172 of controlling a rate of feeding grain to an unloader conveyor 12 of an agricultural harvester of the present invention is now discussed. As further shown in FIG. 5, method 172 is a continuous closed feedback loop in which controller 36 (FIG. 3) monitors whether the unloader system, and more specifically unloader conveyor 12 and apparatus 18 is on or operational, as denoted by decision block 180. If the unloader system is off or non-operational the control loop is restarted, but if the unloader system is on or operational, the control loop proceeds to optionally set an operating parameter to be monitored, such as torque or speed, denoted by block 182.

Once the operating parameter is optionally set (or not), the operator selectively sets an operating parameter of apparatus 18, such as conveyance rate as denoted in block 183. For example, the operator may want to selectably set the conveyance rate of apparatus 18 at a specific level, e.g., 50 percent of maximum conveyance rate, or less, such as to retain improved control of the unloading process, such as unloading grain into a smaller collection vessel. Once the operator has set the operating parameter of apparatus 18, another parameter, such the total engine power consumed is monitored or measured, denoted by block 184. It is to be understood that any number of other parameters could similarly be monitored and measured, as previously discussed. Once the engine power consumed or used ("EPU") has been monitored or measured, the EPU parameter is compared to a maximum predetermined threshold value, such as a maximum predetermined engine power value in block 186. In one embodiment, in block 186 the parameter is also compared to a minimum predetermined threshold value, although both minimum and maximum predetermined threshold values are shown in block 186.

Once EPU is compared to the maximum predetermined engine power value in block 186, in decision blocks 188, 192, 196 a determination is made as to whether EPU is respectively less than, substantially equal to, or greater than the maximum predetermined engine power value in the respective decision blocks, i.e., whether there is available engine power.

If EPU is less than the maximum predetermined engine power value in block 188, there is available engine power, and the conveyance rate of apparatus 18 is increased, denoted by block 190. The amount of increased conveyance rate can be a predetermined amount or percentage greater than the current conveyance rate, or in another embodiment, the predetermined amount of increased conveyance rate can correspond to a percentage of the available engine power. In one embodiment, the percentage can correspond to 100 percent of the available power.

Once the conveyance rate of apparatus 18 has been increased in block 190, control of the loop proceeds to block 199, in which controller 36 (FIG. 3) monitors whether the unloader system, and more specifically unloader conveyor 12 and apparatus 18, is on or operational. If the unloader system is off or non-operational the control loop is restarted, but if the unloader system is on or operational, the control loop proceeds to monitor EPU as denoted by block 184, as previously discussed.

However, if the parameter, such as EPU is not less than the maximum predetermined engine power value in block 188, a determination is made whether EPU is substantially equal to the maximum predetermined threshold value, as denoted in block 192. If EPU is substantially equal to the available power, there is no available engine power, and the conveyance rate of apparatus 18 is maintained, as denoted in block 194, and control of the loop proceeds to block 199.

In block 199, controller 36 (FIG. 3) monitors whether the unloader system, and more specifically unloader conveyor 12 and apparatus 18, is on or operational. If the unloader system is off or non-operational the control loop is restarted, but if the unloader system is on or operational, the control loop proceeds to monitor EPU as denoted by block 184, as previously discussed.

However, if EPU is not substantially equal to the maximum predetermined engine power value in block 192, a determination is made whether EPU is greater than the maximum predetermined engine power value, as denoted in block 196. Moreover, since EPU is not less than the maximum predetermined engine power value (block 188) nor equal to the maximum predetermined engine power value (block 192), EPU must be greater than the maximum predetermined engine power value (block 196). Since EPU is less than the available power, there is a shortage of engine power, and the conveyance rate of apparatus 18 is reduced, as denoted in block 198, and control of the loop returns to block 199.

In block 199, controller 36 (FIG. 3) monitors whether the unloader system, and more specifically unloader conveyor 12 and apparatus 18, is on or operational. If the unloader system is off or non-operational the control loop is restarted, but if the unloader system is on or operational, the control loop proceeds to monitor EPU as denoted by block 184, as previously discussed.

By virtue of the exemplary method of the present invention, a parameter, such as harvester engine power use or output is maintained near a maximum predetermined threshold value by allocating available engine power to the apparatus of the unload system. This allocation of additional engine power thereby results in an increase in the conveyance rate of the apparatus of the unload system. Alternately, where there is a power shortfall, the power allocated to the apparatus of the unload system is reduced, thereby decreasing the conveyance rate of the apparatus of the unload system so that the engine power consumed does not exceed the amount of engine power that is available to operate the harvester.

It is to be understood that any identified increases or reductions of operating parameters of the apparatus of the unload system, such as conveyance rate in the exemplary methods cannot be implemented if such increases or decreases fall outside of predetermined operational limitations or a predetermined operating range of the apparatus of the unload system. Therefore, in such instances where there is be available engine power, and the apparatus of the unload system is operating at a maximum conveyance rate, the associated operating parameters of the apparatus of the unload system will not be further increased. Conversely, in such instances where there is a shortage of engine power or other maximum predetermined threshold value is exceeded, and the apparatus of the unload system is operating at a minimum conveyance rate, the associated operating parameters of the apparatus of the unload system will not be further decreased.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method of controlling a conveyance rate of grain of an unloader system, comprising:

providing a grain holding device;

providing an unloader, the unloader having an inlet for receiving grain from the grain holding device and an outlet for discharging grain;

providing an apparatus within the grain holding device operable for controllably feeding grain within the grain holding device to the unloader;

monitoring a parameter representative of an amount of power used by the apparatus supplied by a power source of the apparatus;

comparing the parameter of the power source to a threshold value and determining an available power of the power source; and automatically controlling the conveyance rate of grain of the apparatus to the unloader based on the comparison of the parameter.

2. The method of claim 1, wherein automatically controlling includes controllably increasing the conveyance rate of grain of the apparatus within a predetermined operating range when the monitored parameter is less than the threshold value, wherein the threshold value is a maximum predetermined threshold value.

3. The method of claim 1, wherein automatically controlling includes controllably decreasing the conveyance rate of grain of the apparatus such that grain is conveyed within a predetermined operating range when the monitored parameter is greater than the maximum threshold value.

4. The method of claim 1, wherein automatically controlling includes controllably maintaining the conveyance rate of grain of the apparatus within a predetermined operating range when the monitored parameter is substantially equal to the maximum threshold value.

5. The method of claim 1, wherein comparing the parameter of the apparatus includes comparing the parameter of the power source to a minimum predetermined threshold value.

6. The method of claim 1, wherein the parameter is selected from the group consisting of torque, speed, fuel consumption, coolant temperature, amperage, pressure and oil temperature.

7. A method of controlling a conveyance rate of grain of an unloader system, comprising:

providing a grain holding device;

providing an unloader, the unloader having an inlet for receiving grain from the grain holding device and an outlet for discharging grain;

providing an apparatus within the grain holding device operable for controllably feeding grain within the grain holding device to the unloader;

monitoring a parameter of a power source of the apparatus representative of an amount of power consumed from the power source;

comparing the parameter of the power source to a maximum predetermined threshold value and determining available power of the power source; and automatically controlling the conveyance rate of grain of the apparatus to the unloader based on the determined available power.

8. The method of claim 7, wherein automatically controlling includes controllably increasing the conveyance rate of grain of the apparatus within a predetermined operating range when the monitored parameter is less than the maximum threshold value.

9. The method of claim 7, wherein automatically controlling includes controllably decreasing the conveyance rate of grain of the apparatus within a predetermined operating range when the monitored parameter is greater than the maximum threshold value.

10. The method of claim 7, wherein automatically controlling includes controllably maintaining the conveyance rate of grain of the apparatus within a predetermined operating range when the monitored parameter is substantially equal to the maximum threshold value.

11. The method of claim 7, wherein comparing the parameter of the apparatus includes comparing the parameter of the power source to a minimum predetermined threshold value.

12. The method of claim 7, wherein the parameter is selected from the group consisting of torque, speed, fuel consumption, coolant temperature, amperage, pressure and oil temperature.

13. A harvesting machine comprising a power source configured for providing power to at least one apparatus;

a grain holding device on the harvester;

an unloader for the grain holding device, the unloader having an inlet for receiving grain from the grain holding device and an outlet for discharging grain from the harvester;

wherein the at least one apparatus is within the grain holding device and operable for controllably feeding grain within the grain holding device to the unloader;

a control system configured to monitor a parameter representative of an amount of power supplied by the power source to the apparatus, compare the parameter of the power source to a threshold value and determining available power of the power source;

wherein the controller automatically controls the conveyance rate of grain of the apparatus to the unloader based on the comparison of the parameter of the power source.

14. The harvesting machine of claim 13, wherein the control system is configured to increase the conveyance rate of grain of the apparatus within a predetermined operating range when the monitored parameter is less than the threshold value, wherein the threshold value is a maximum predetermined threshold value.

15. The harvesting machine of claim 13, wherein the control system is configured to decrease the conveyance rate of grain of the apparatus within a predetermined operating range when the monitored parameter is greater than the maximum predetermined threshold value.

16. The harvesting machine of claim 13, wherein the control system is configured for maintaining the conveyance rate of grain of the apparatus within a predetermined operating range when the monitored parameter is substantially equal to the maximum predetermined threshold value.

17. The harvesting machine of claim 13, wherein comparing the parameter of the apparatus includes comparing the parameter of the power source to a minimum predetermined threshold value.

18. The harvesting machine of claim 13, wherein the parameter is selected from the group consisting of torque, speed, fuel consumption, coolant temperature, amperage, pressure and oil temperature.

19. The harvesting machine of claim 13, wherein the predetermined threshold value is representative of an available power of the power source.

* * * * *